United States Patent
Batsch-Smith

(10) Patent No.: US 11,070,064 B2
(45) Date of Patent: Jul. 20, 2021

(54) POWER PLANTS USING INCONGRUENT LOAD IMBALANCE RESPONSE

(71) Applicants: Mitsubishi Power Americas, Inc., Lake Mary, FL (US); Mitsubishi Power, Ltd., Yokohama (JP)

(72) Inventor: Lisa Batsch-Smith, Orlando, FL (US)

(73) Assignees: Mitsubishi Power Americas, Inc., Lake Mary, FL (US); Mitsubishi Power, Ltd., Yokohama (JP)

( * ) Notice: Subject to any disclaimer, the term of this patent is extended or adjusted under 35 U.S.C. 154(b) by 0 days.

(21) Appl. No.: 16/606,941

(22) PCT Filed: Dec. 8, 2017

(86) PCT No.: PCT/US2017/065314
§ 371 (c)(1),
(2) Date: Oct. 21, 2019

(87) PCT Pub. No.: WO2019/112604
PCT Pub. Date: Jun. 13, 2019

(65) Prior Publication Data
US 2020/0295573 A1 Sep. 17, 2020

(51) Int. Cl.
*H02J 3/46* (2006.01)
*F01K 23/10* (2006.01)
*F01K 13/02* (2006.01)

(52) U.S. Cl.
CPC .............. *H02J 3/46* (2013.01); *F01K 13/02* (2013.01); *F01K 23/101* (2013.01)

(58) Field of Classification Search
CPC ......... F01K 13/02; F01K 23/101; F01K 23/10
See application file for complete search history.

(56) References Cited

U.S. PATENT DOCUMENTS

2015/0295581 A1   10/2015   Shi et al.
2016/0222816 A1   8/2016    Chen et al.

FOREIGN PATENT DOCUMENTS

CN   104847427 B   3/2017
CN   111684678     9/2020
(Continued)

OTHER PUBLICATIONS

"Japanese Application Serial No. 2020-505221, Notification of Reasons for Refusal dated Dec. 8, 2020" w/English Translation, 18 pgs.

(Continued)

*Primary Examiner* — Robert L Deberadinis
(74) *Attorney, Agent, or Firm* — Schwegman Lundberg & Woessner, P.A.

(57) ABSTRACT

A method (110) of controlling an imbalance response in a power plant comprising first and second gas turbine engines and a steam turbine driven by steam generated by exhaust from the first and second gas turbine engines can comprise operating the first gas turbine engine at a first power output (116A), operating the second gas turbine engine at a second power output (116B), monitoring load demand from a power grid operating at a steady state condition (114), detecting a load imbalance on the power grid (120) that causes a deviation from the steady state condition, and adjusting the first power output and the second power output incongruently (128) during the imbalance response to change the first power output and the second power output to match the deviation from the steady state condition depending on contemporaneous efficiency states of the first and second gas turbine engines.

26 Claims, 6 Drawing Sheets

(56) References Cited

FOREIGN PATENT DOCUMENTS

| EP | 3054129 A1 | 8/2016 |
|---|---|---|
| JP | S60200733 | 10/1985 |
| JP | S6135122 | 2/1986 |
| JP | 2016153645 | 8/2016 |
| JP | 2020530886 | 10/2020 |
| KR | 20160053126 A | 5/2016 |
| WO | WO-2019112604 A1 | 6/2019 |

OTHER PUBLICATIONS

"European Application Serial No. 17825677.2, Response filed Jan. 25, 2021 to Communication pursuant to Rules 161(1) and 162 EPC", 23 pgs.

"International Application Serial No. PCT/US2017/065314, International Search Report dated Sep. 4, 2018", 6 pgs.

"International Application Serial No. PCT/US2017/065314, Written Opinion dated Sep. 4, 2018", 9 pgs.

"International Application Serial No. PCT US2017 065314, International Preliminary Report on Patentability dated Jun. 18, 2020", 11 pgs.

"Japanese Application Serial No. 2020-505221, Response filed Mar. 8, 2021 to Notification of Reasons for Refusal dated Dec. 8, 2020", w o English Translation, 14 pgs.

ically, but not by way of limitation, to electrical power plants including gas turbine engines. More specifically, but not by way of limitation, the present application relates to control systems for electrical power plants having a load imbalance response to changing grid conditions.

POWER PLANTS USING INCONGRUENT LOAD IMBALANCE RESPONSE

PRIORITY APPLICATIONS

This application is a U.S. National Stage Filing under 35 U.S.C. 371 from International Patent Application Serial No. PCT/US2017/065314, filed Dec. 8, 2017, published on Jun. 13, 2019 as WO 2019/112604, the content of which is incorporated herein by reference in its entirety.

TECHNICAL FIELD

This document pertains generally, but not by way of limitation, to electrical power plants including gas turbine engines. More specifically, but not by way of limitation, the present application relates to control systems for electrical power plants having a load imbalance response to changing grid conditions.

BACKGROUND

Power plants typically supply power to a grid system within a distributed network where voltage is provided at a constant amplitude or magnitude. The grid system is managed to maintain frequency regulation, such as at a control frequency of, for example, 60 Hertz (Hz), so that the frequency and voltage magnitude maintain stability across a broad range of power input and load conditions. Each power plant can separately provide power to the grid system using a controlled frequency that can coincide with the control frequency. Put another way, each power plant is expected to contribute power to meet the demand such that the grid system operates with the desired degree of frequency regulation, such as at the control frequency. Typical loading on the grid system will not vary enough to cause the system frequency to change from the control frequency. However, when the load on the grid system changes sufficiently, such as during a load imbalance event, the system frequency will change from the control frequency. For example, when the grid system suddenly becomes heavily loaded, the system frequency will drop as each power plant correspondingly becomes more heavily loaded. That is, the additional load on each electrical generator will cause the generator to slow down. The frequency of a synchronous generator is governed by Equation [1].

$$F = \frac{PN}{120} \qquad \text{Equation [1]}$$

In Equation [1], F is frequency in Hertz (Hz), P is the number of poles in the generator, and N is the speed of the generator in revolutions per minute (RPM). Some power plants operate gas turbine engines as prime movers to operate electrical generators. In order to produce the additional power required by the grid system, a control system for each power plant can provide additional fuel to gas turbine engine combustors according to a predetermined schedule corresponding to a prescribed "droop response." As additional power is provided to the grid system to accommodate the increased power demand, the speed (N) of the prime mover (e.g. the rotational shaft speed of a gas turbine engine) driving the generator and the grid frequency will increase back to a desired system frequency (F), which can correspond to the control frequency.

In order to distribute the additional demand placed on the grid system during a load imbalance event, power plant control systems operate under a conventional response plan. For example, each electrical generator will respond to a percentage drop in the control frequency by increasing its output a fixed amount. This is commonly referred to a "droop response." Droop response can be described as a change in design speed for a 100% governor action. For a 4% droop response, a generator will increase power output 25% for each 1% drop in the control frequency. Thus, a larger or more robust droop response level comprises a smaller droop response percentage as compared to, for example, a typical 4% droop response. Likewise, a smaller or less robust droop response level comprises a larger droop response percentage as compared to, for example, a typical 4% droop response. Droop response is typically regulated by the North American Electric Reliability Corporation (NERC) so that all power plants respond to a load imbalance in the same manner.

Examples of controlling power production in power plants are described in U.S. Pat. No. 4,305,129 to Yannone et al.; U.S. Pat. No. 9,472,954 to Piyabongkarn et al.; and U.S. Pub. No. 2012/0317973 to Galen.

Overview

The present inventor has recognized, among other things, that a problem to be solved can include inefficient droop responses placed on various power plants within a grid system and various electrical generators within a power plant. For example, each power plant in a grid system and each generator within a power plant is typically expected to provide the same droop response during a load imbalance event. Uniform droop responses can give rise to inefficiencies at the power plant level and at the individual generator level due to, for example, operational, electrical, administrative, productive, mechanical, economical and financial differences between power plants and generators.

The present subject matter can help provide a solution to this problem and other problems, such as by increasing droop response efficiencies by allowing generators within power plants to react differently to a load imbalance event with different droop responses based on, for example, one of more of mechanical operating efficiency, maintenance history, contractual obligations and financial obligations associated with each generator. Droop response efficiency can be increased by allowing electrical generators within a power plant to have different imbalance responses to take advantage the aforementioned electrical, mechanical, financial, etc. differences between electrical generators.

In an example, a method of controlling an imbalance response in a power plant comprising a first gas turbine engine, a second gas turbine engine and a steam turbine driven by steam generated by exhaust from the first gas turbine engine and the second gas turbine engine can comprise operating the first gas turbine engine at a first power output, operating the second gas turbine engine at a second power output, monitoring load demand from a power grid operating at a steady state condition, detecting a load imbalance on the power grid that causes a deviation from the steady state condition, and adjusting the first power output and the second power output incongruently during the imbalance response to change the first power output and the second power output to match the deviation from the steady state condition depending on contemporaneous efficiency states of the first gas turbine engine and the second gas turbine engine.

In another example, a method of controlling power plant operation in response to changing conditions of a power grid can comprise monitoring an operating frequency of the power grid relative to a control frequency, operating a first gas turbine and a second gas turbine at the control frequency to provide a total power output to meet the power demand under steady state operating conditions, wherein under steady state operating conditions a first power output of the first gas turbine and a second power output of the second gas turbine are equal, detecting a load imbalance from the power grid wherein the operating frequency and the control frequency are different, and operating the first gas turbine and the second gas turbine to provide an imbalance response wherein the first power output and the second power output are incongruent such that the power plant operates to increase an operational efficiency during the load imbalance compared to a congruent power output response of the first gas turbine and the second gas turbine during the load imbalance.

In an additional example, a control system for operating a power plant can comprise a first engine controller for controlling a first combustion process in a first gas turbine engine powering a first electric generator, a second engine controller for controlling a second combustion process in a second gas turbine engine powering a second electric generator, and a power plant controller comprising a gas turbine interface for providing control input signals to the first engine controller and the second engine controller to control output of the first electric generator and the second electric generator, a grid interface for receiving a control frequency at which a power grid is to be operated, a droop response instruction for responding to a load imbalance on the power grid, and a current operating frequency of the power grid, and memory having stored therein efficiency data for the first gas turbine engine and the second gas turbine engine, wherein the power plant controller is configured to incongruently provide control input signals to the first engine controller and the second engine controller based on the efficiency data in response to the current operating frequency deviating from the control frequency in order to meet the droop response instruction.

This overview is intended to provide an overview of subject matter of the present patent application. It is not intended to provide an exclusive or exhaustive explanation of the invention. The detailed description is included to provide further information about the present patent application.

Figure 1:
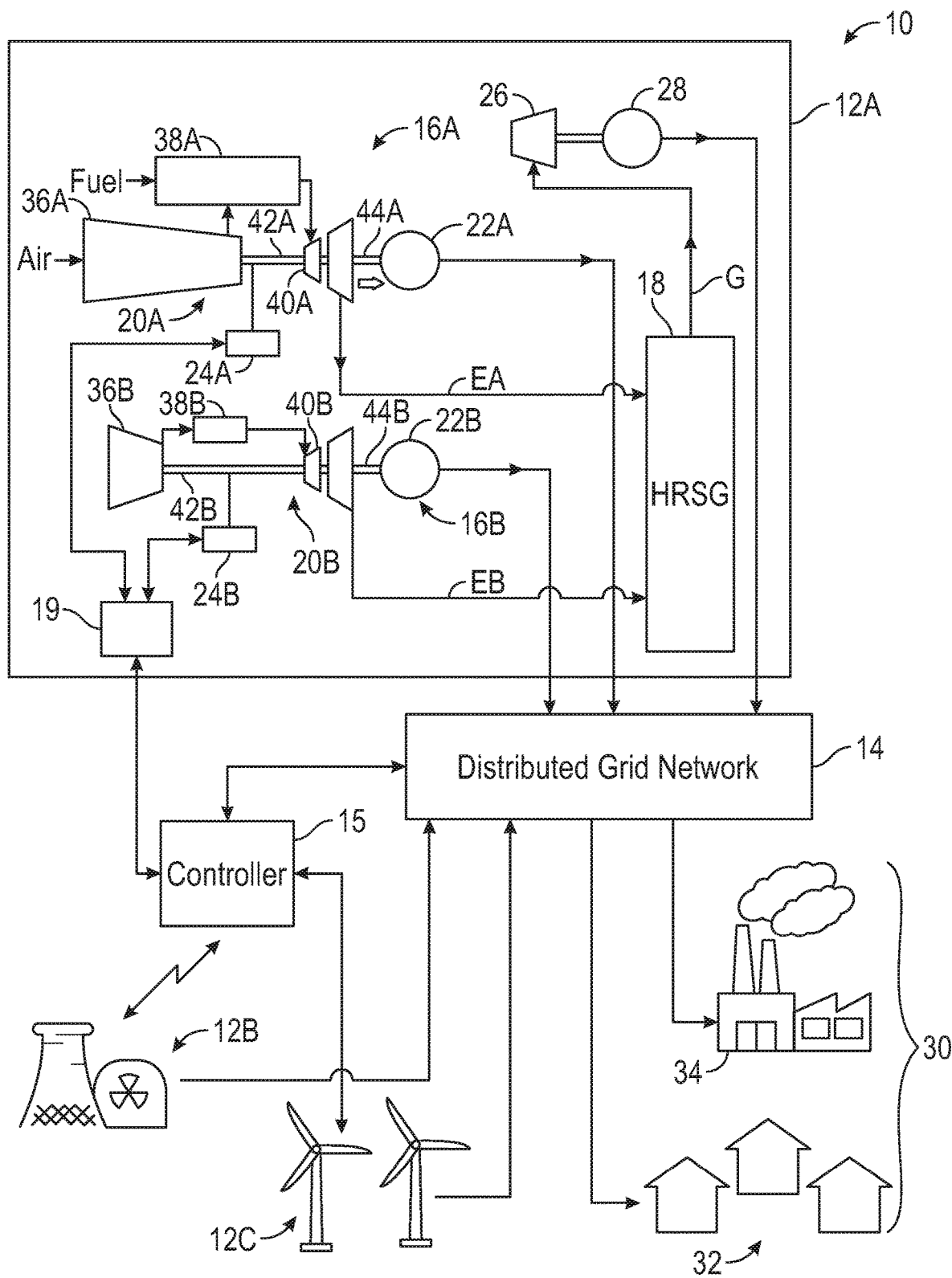
FIG. 1 is a schematic diagram illustrating a power system including multiple electrical generator units within multiple power plants providing output to a distributed grid network.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a schematic diagram of power system 10 illustrating power plant 12A, power plant 12B and power plant 12C providing electrical power to distributed grid network (DGN) or "grid" 14, which can include controller 15. First power plant 12A can include first generator unit 16A, second generator unit 16B, heat recovery steam generator (HRSG) 18, and controller 19. First generator unit 16A can comprise first gas turbine 20A, first electrical generator 22A and first engine controller 24A, such as a Distributed Control Systems (DCS) device. Second generator unit 16B can comprise second gas turbine 20B, second electrical generator 22B and second engine controller 24B, such as a DCS device. HRSG 18 can be operatively coupled to steam turbine 26, which can be connected to electrical generator 28. DGN 14 can be configured to deliver power from electrical generators 22A, 22B and 28 to end users 30, which can include residential housing units 32 and factory 34, for example.

The present application is directed to systems and methods for controlling power delivery from electrical generators 22A, 22B and 28 to DGN 14 during load imbalance situations, such as when another power plant, such as one of power plants 12B or 12C goes offline, particularly in a sudden fashion, or when factory 34 goes online, particularly in a sudden fashion. For example, engine controllers 24A and 24B can cooperate with controller 19 to operate generator units 16A and 16B under different conditions to more efficiently provide power to end users 30 via DGN 14 during the load imbalance. In various scenarios, system efficiency can be achieved by operating power plant 12A most operationally efficient (also herein referred to as a "contemporaneous efficiency state"), including both productive and economical efficiencies. In various applications, power plant 12A can be operated most efficiently by operating gas turbines 20A and 20B in an incongruent, e.g., asymmetric or non-uniform manner, such as where turbines 20A and 20B are controlled to provide power levels that differ between each other in response to a load imbalance in system 10. While an embodiment of the disclosure has been described with turbines 20A, 20B, 26 connected individually to generators 22A, 22B, 28, it will be appreciated that the scope of the disclosure is not so limited, and shall include other arrangements of turbines and generators, such as to couple all turbines to a signal generator, or to couple the gas turbines 20A, 20B to a single generator, etc., for example.

As will be discussed below in greater detail, if the load demand upon DGN 14 is decreasing, and requires a reduction in power generation, the power output of the less efficient gas turbine can be decreased more during the transition period (the time it takes for system 10 to adjust to the load imbalance situation (whether comprising a short term transitory imbalance or a long term new output level) than the power output of the more efficient gas turbine. Likewise, if the load demand upon DON 14 is increasing, and requires an increase in power generation, the power output of the more efficient gas turbine can be increased more during the transition period than the power output of the less efficient gas turbine. For example, controller 19 can operate gas turbine 20A at a lower droop response percentage (e.g., 3%) and operate gas turbine 20B at a higher droop response percentage (e.g., 4%) if gas turbine 20A is, at the time of the load imbalance, operating at a higher mechanical efficiency for the given load placed on first power plant 12A by DON 14. That is, first gas turbine 20A will be more responsive and provide more power to DON 14.

As is known in the art, gas turbines 20A and 20B operate by compressing air with a compressor, and burning fuel within the compressed air to generate high energy gases that pass through a turbine that produces rotational shaft power to drive an electrical generator. Gas turbine 20A can include compressor 36A, combustor 38A, turbine 40A, turbine shaft 42A and output shaft 44A. Gas turbine 20B can include compressor 36B, combustor 38B, turbine 40B, turbine shaft 42B and output shaft 44B. In some non-limiting examples of embodiments of the present application, gas turbines 20A and 20B are constructed in the same manner, e.g., are the same model or have the same capacity.

Engine controllers 24A and 24B can control the amount of fuel that is delivered to combustors 38A and 38B, thereby controlling the power output of gas turbines 20A and 20B and thus influence the rotational speed of turbine shafts 42A and 42B. Engine controllers 24A and 24B can operate the output of gas turbines 20A and 20B such that the speed of turbine shafts 42A and 42B operate at a control frequency of system 10 under steady state operating conditions.

Exhaust gas EA and EB of gas turbines 20A and 20B, respectively, can be directed to HRSG 18. HRSG 18 can utilize the hot exhaust gas EA and EB to produce gas G, such as steam, for driving turbine 26.

Electrical output of generators 22A and 22B and electrical generator 28 can be provided to DGN 14. Controller 19 can interface with engine controllers 24A and 24B to control generator units 16A and 16B to provide power to DGN 14 to, among other things, correct load and supply imbalance. For example, engine controllers 24A and 24B can operate the output of gas turbines 20A and 20B such that the speed of turbine shafts 42A and 42B return to the control frequency of system 10 in response to a load imbalance where the speed of turbine shafts 42A and 42B deviate from the control frequency.

Grid 14 can operate under a frequency control regime. During steady state operation, power plants 12A, 12B and 12C provide power to grid 14 at a control frequency, such as 60 Hertz. End users 30 can also operate at various levels, thereby creating a total load demand upon the DGN 14 that can change. Thus, controller 15 can distribute the total load demand amongst power plants 12A, 12B and 12C, which can then operate to provide their assigned share of the load demand, operating with a bias toward the control frequency. Each of power plants 12A, 12B and 12C can internally determine how to generate their share of the total load demand. For example, power plant 12C can operate some or all of the total number of wind turbines in power plant 12C. Also, power plant 12A can determine to operate gas turbines 20A and 20B to each equally divide the share of power that they produce as part of power plant 12A. Thus, under steady state operating conditions, end users 30 place a total load demand on grid 14, and controller 15 allocates the total load demand to power plants 12A, 12B and 12C.

End users 30, or consumers or customers, typically operate within a reasonably predictable operating band for any point in time such that small changes in the total power demand do not produce significant changes in the operation of power plants 12A, 12B and 12C. That is, for example, controller 15 can be programmed to estimate total demand from end users 30 based on seasonal, weather, operational, demographic and historical usage data to within a known operating band. However, sometimes load imbalances can be produced if the total load demand rapidly changes, either upward or downward. Also, the share of the total load demand on each of power plants 12A, 12B and 12C can rapidly change in the event one of power plants 12A, 12B and 12C goes offline, or has a temporary change in power output. In either of these load spike scenarios, controller 15 typically requests each of power plants 12A, 12B and 12C respond in an appropriate manner such that additional loading is shared either equally or proportionally. Regardless, controller 15 expects each of power plants 12A, 12B and 12C to react in a particular manner in response to a load imbalance. For example, in the event of an unexpected load increase, controller 15 can typically request a 4% droop response from each of power plants 12A, 12B and 12C, assuming each is capable of such response. For example, power plant 12C may not be capable of such a response given wind conditions.

In other embodiments, a load imbalance may result when controller 15 determines that the operating point for the predictable operating band should be reset to a higher or lower output level. For example, controller 15 may request lower collective output from power plants 12A, 12B and 12C during night time as compared to day time due to lower demand. As such, a load imbalance may occur within DGN 14 during a load down (or converse, load up) event.

Aspects of the present application are directed to each power plant 12A, 12B and 12C internally managing how to provide the imbalance response called for by the grid via controller 15. For example, if controller 15 requests a 4% droop response from power plant 12A, each of generator units 16A and 16B can react with a 4% droop response. However, controller 19 for power plant 12A can allocate the imbalance response incongruently between generator units 16A and 16B so that controller 15 and DGN 14 still receives the desired imbalance response, e.g., the 4% droop response. Controller 19 can divide the imbalance response based on the operational efficiencies, including productive, e.g., mechanical, efficiencies of generator units 16A and 16B, and economical, e.g., financial, efficiencies of generator units 16A and 16B, for example.

Figure 2:
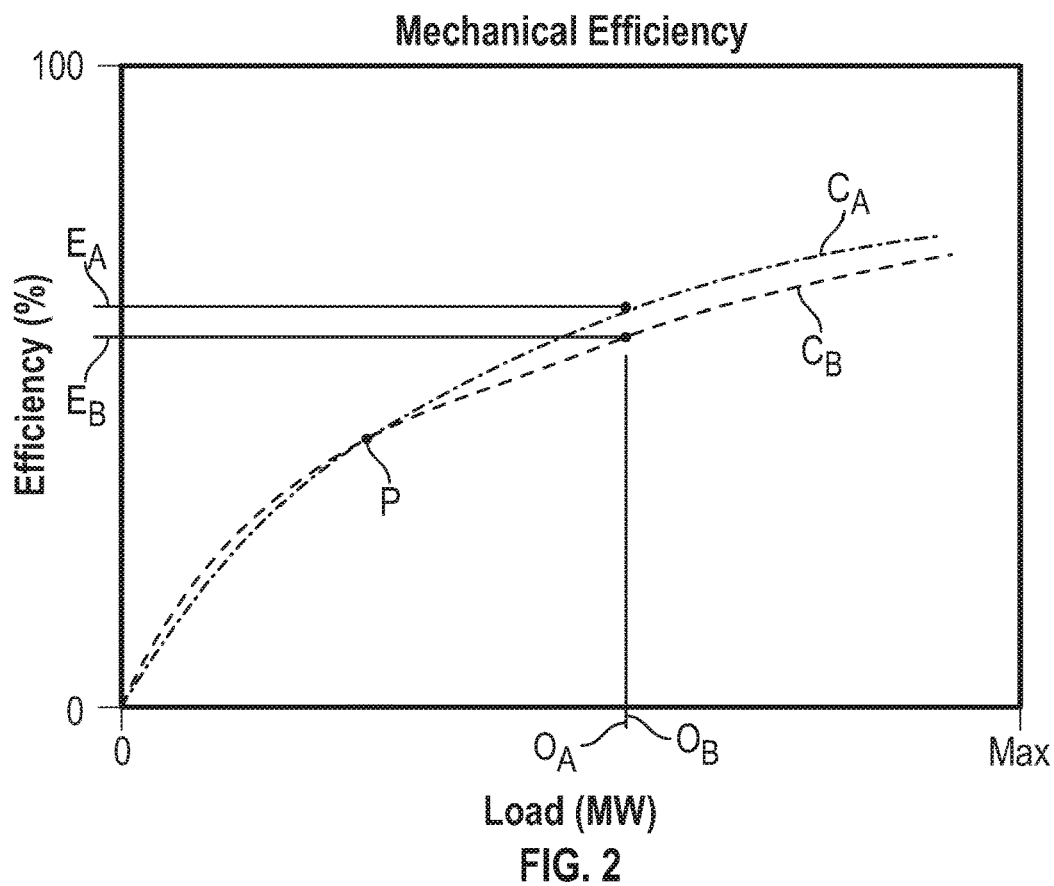
FIG. 2 is a graph illustrating efficiency of the electrical generator units of one of the power plants of FIG. 1 relative to operating power output.

FIG. 2 is a chart illustrating exemplary productive or mechanical efficiency curves. Efficiency curve $C_A$ of a first generator unit, such as generator unit 16A of FIG. 1, and efficiency curve $C_B$ of a second generator unit, such as generator unit 16B of FIG. 1, relative to operating power output $O_A$ and $O_B$, respectively, are shown. FIG. 2 illustrates an example mechanical efficiency plot for each of generator units 16A and 16B. As will be appreciated by one of skill in the art, the mechanical efficiency described below approximates the amount of output per given input unit, for example, the amount of power produced per given unit of fuel. The horizontal, or X, axis shows output O of generator units 16A and 16B in megawatts (MW), for example. The vertical, or Y, axis shows efficiency E of generator units 16A and 16B as a percentage of full or perfect efficiency. At point P, the efficiencies of generator units 16A and 16B are the same. At output levels below point P, generator unit 16B is more efficient. At output levels above point P, generator unit 16A is more efficient.

As can be seen in curves $C_A$ and $C_B$, generator units 16A and 16B become more efficient as load increases toward the maximum load, but do not reach 100% efficiency. Curves $C_A$ and $C_B$ are very similar for embodiments where generator units 16A and 16B are the same, e.g., the same model, the same rating, the same configuration, etc. However, due to various factors, curves $C_A$ and $C_B$ can be different, even for the same generator units. For example, one of generator units 16A and 16B may be older and have more worn components, and thus be less efficient. Also, a greater amount of time may have passed since one of generator units 16A and 16B received a maintenance overhaul, thus also potentially making the gas turbine therein less mechanically efficient. For example, gas turbine 20A may be less efficient at low load, but may become more efficient at high load, as compared to gas turbine 20B. The efficiency curves $C_A$ and $C_B$ can crossover at point P.

Thus, it can be more mechanically efficient to rely on gas turbine 20A under high loading conditions when steady state operation is near the maximum load, particularly during a load imbalance. Greater mechanical efficiency can lead to improved operational efficiency, which can result in monetary benefits of the operator of power plant 12A.

Figure 3:
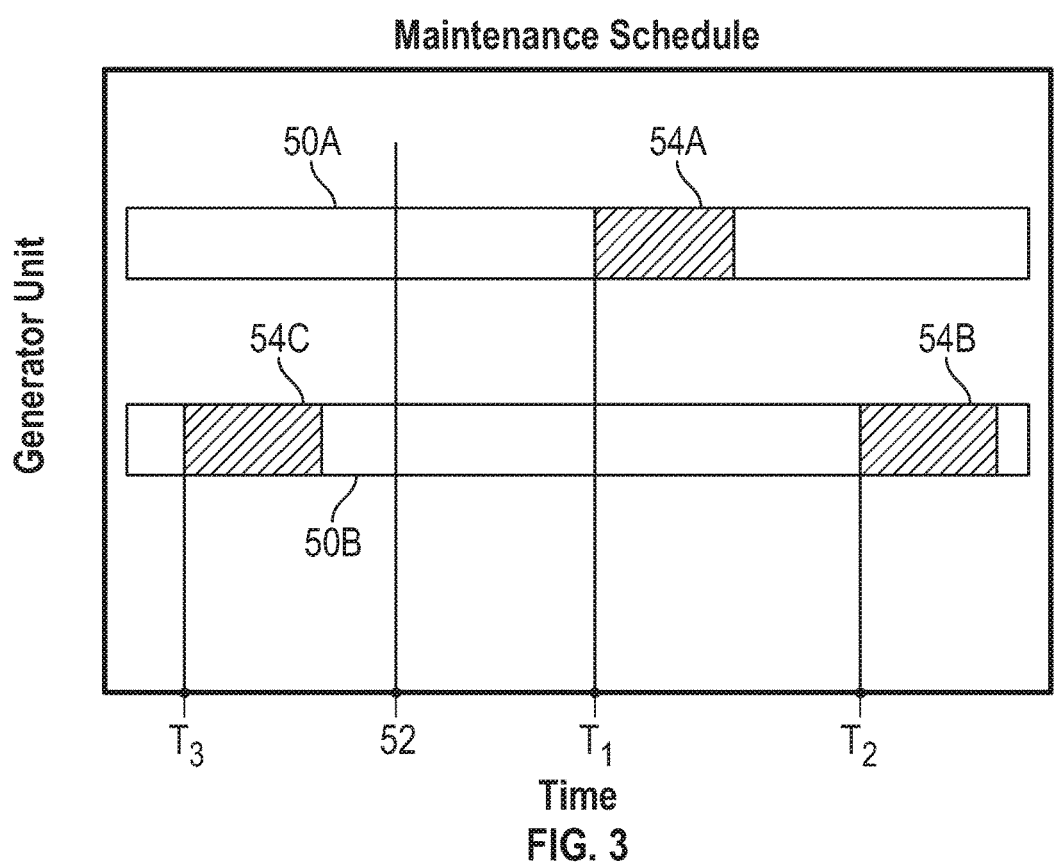
FIG. 3 is a chart illustrating maintenance schedules for the electrical generator units of one of the power plants of FIG. 1.

FIG. 3 is a chart illustrating exemplary maintenance schedules 50A and 50B for generator units 16A and 16B of power plant 12A of FIG. 1. FIG. 3 illustrates an example economical or financial efficiency basis for each of generator units 16A and 16B. Maintenance schedules 50A and 50B are shown relative to the present date represented by point 52, for any given point in time. Thus, gas turbine 20A has not recently received a maintenance overhaul, but is scheduled to receive maintenance overhaul 54A at time $T_1$. Gas turbine 20B is scheduled to receive maintenance overhaul 54B at time $T_2$, and has recently received maintenance overhaul 54C at time $T_3$.

Incongruent load response can be determined by selecting one of generator units 16A and 16B to provide more output to meet the load imbalance during the imbalance response based on which generator unit will provide the least expensive operating conditions (i.e. the better economical efficiency), thereby incurring a lower financial cost. Thus, even though one generator unit may be more mechanically efficient and require less fuel to operate, it may be more expensive to operate given various maintenance and contractual obligations. For example, generator units may operate under Long Term Service Agreements (LTSA) where the original equipment manufacturer of the gas turbine engine provides servicing of each unit, including both labor and parts costs. Payment for these agreements can be based on economical conditions of the engines, such as the number of effective operation hours, the number of starts and stops that an engine has undergone, and the number of hours operated at particular temperatures. LTSAs may have different charges based on these operating parameters, with additional charges sometimes being incurred if the customer operates the generator unit outside of pre-agreed-upon operating conditions. Thus, operating costs can be reduced under various conditions, outside of a pure mechanical fuel-in, power-out determination, by reducing operation of a generator unit that is approaching a financial event (e.g., a contractual limit such as number of operating hours, cycle starts, or time at a particular temperature). Thus, negative revenue events, such as incurring a contractual monetary penalty or incurring an expected maintenance expense, can be avoided or delayed. Thus, a positive overall revenue contribution can be achieved in the long or short run based on the specific contractual requirements.

Based on the various mechanical and financial conditions described above, controller 19 can determine or be programmed to determine which of generator units 16A and 16B can be incongruently, or asymmetrically, favored or biased during a load imbalance, which may typically last for only a terminable transition period. Such evaluation or determination can be implemented automatically, such as using one or more processor circuits coupled to one or more memory circuits or other storage devices. A cost or efficiency function can be established accounting for the various factors mentioned above (e.g., mechanical or financial constraints), such as implemented using one or more of a look-up-table, an analytical expression (e.g., including various parameters or weighting factors), or other scheme. In an example, inputs to the cost or efficiency function can include one or more of a monitored parameter (e.g., frequency, frequency stability, output power, voltage magnitude) from the power grid to which the generator units 16A or 16B are coupled, or other parameters such as state information concerning the generator units 16A or 16B, or their associated prime movers. An output of the cost or efficiency function can include a relative cost value corresponding to an associated generator units 16A or 16B, or an associated prime mover. Such a cost value can be used to establish an operating point for the first or second generator units 16A or 16B, such as to operate the associated prime movers in an asymmetric manner to perform load imbalance compensation.

Figure 4A:
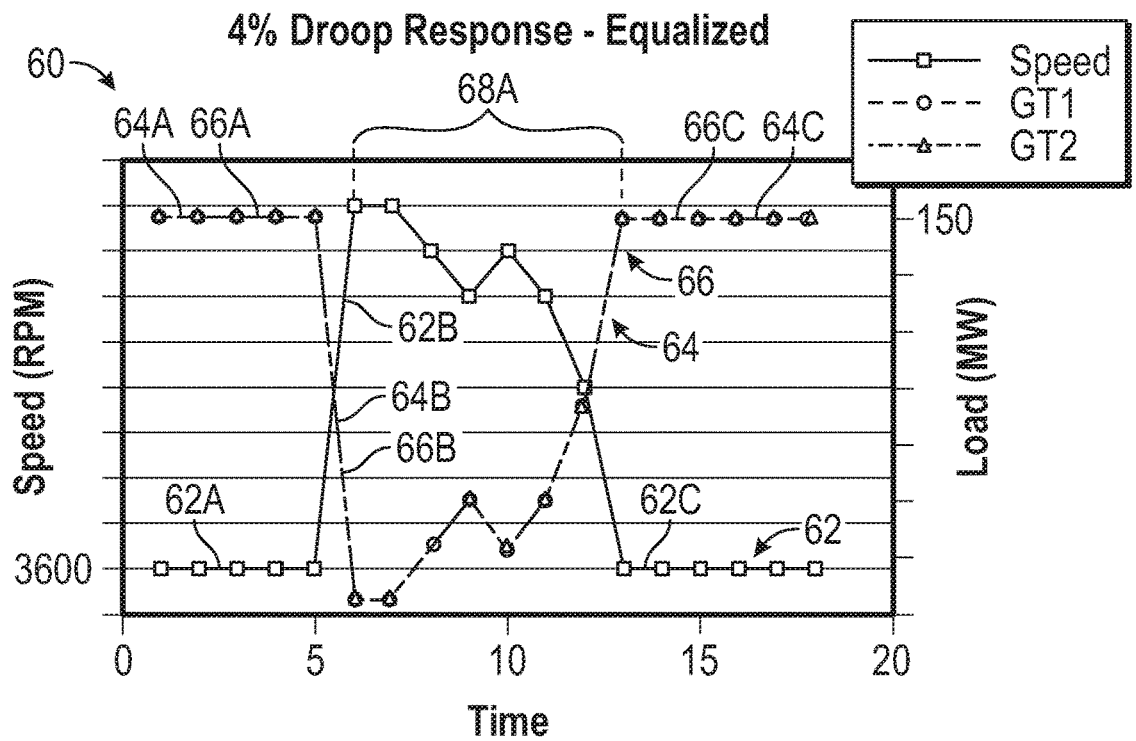
FIGS. 4A and 4B are graphs illustrating conventional droop response and an incongruent droop response of the present application, respectively.
Figure 4B:
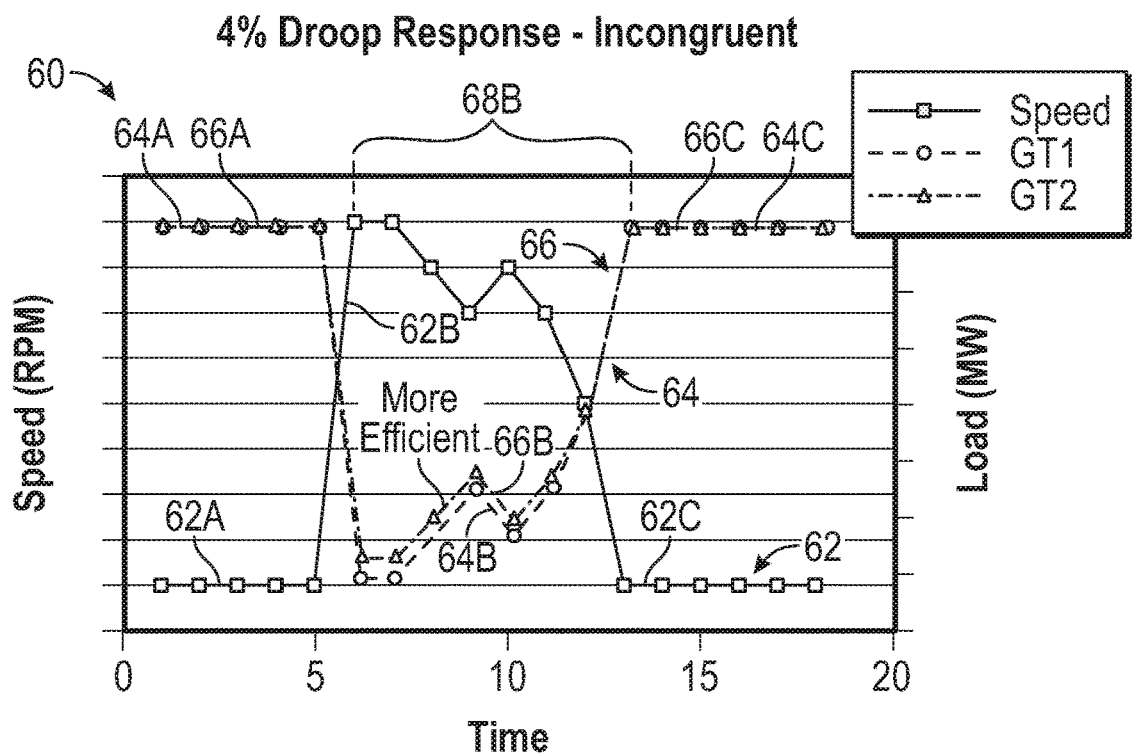

FIGS. 4A and 4B are graphs illustrating a conventional droop response vs. an incongruent, or asymmetric, droop response of the present application, respectively, for temporary load imbalance situations. FIGS. 4A and 4B show graph 60 including speed plot 62, first load plot 64 and second load plot 66. Speed plot 62 can correspond to the operating speeds of generator units 16A and 16B, indicated as revolutions per minute (RPM) (which is indicative of the instantaneous grid frequency). Load plots 64 and 66 can correspond to the load (power output) being provided by each of gas turbines 20A and 20B, such as in megawatts (MW), at a given time. FIGS. 4A and 4B can provide load adjustment for a frequency change that can occur as a result of a load imbalance, such as a temporary change in demand on grid 14.

For example, load plots 64 and 66 indicate that gas turbines 20A and 20B provide a steady state output of, for example, 150 MW at 3600 RPM, as indicated by segments 64A and 66A. Speed plot 62 can operate at 3600 RPM at segment 62A under steady state operating conditions, such as when grid 14 is operating at the control frequency of 60 Hz. During a temporary reduction load imbalance situation, such as a large, short term reduction in power consumption at the factory 34, the load on gas turbines 20A and 20B can suddenly drop at segments 64B and 66B. The reduced load results in an increase of the instantaneous grid frequency relative to the control frequency, as shown by the spike of speed plot 62 at segment 62B to a level above segment 62A, indicating that each of gas turbines 20A and 20B are less burdened. In transition zone 68A of FIG. 4A, controller 19 can operate gas turbines 20A and 20B to adjust the load output of each of gas turbines 20A and 20B until the load returns back to the steady state operating level of 150 MW. Following a load imbalance on grid 14, power plant 12A will return to the previous steady state operation, such as to return to the control frequency and again each provide 150

MW of output. As shown in FIG. 4A, controller 19 can operate gas turbines 20A and 20B equally, or congruently, so that they provide the same load imbalance response as speed returns to the steady state operating condition at segment 62C. For example, NERC guidelines can provide a droop response instruction, such that power plant 12A react to the load imbalance with a 4% droop response. FIG. 4A shows gas turbines 20A and 20B equally sharing the 4% droop response that is provided to grid 14 by power plant 12A.

Alternatively, during the temporary reduction load imbalance situation, the power output of the less efficient gas turbine of the two gas turbines 20A, 20B can be reduced more rapidly, as shown in FIG. 4B.

Likewise, the same principle, to bias, favor, or more rapidly increase the power output of the more efficient gas turbine can apply during a temporary increase load imbalance situation, such as a large, short term increase in power consumption at factory 34, or a sudden increase in temperature resulting in many housing units 32 increasing their use of air conditioners. The droop responses to the short term load imbalance situations can only last for a terminable period of time before the droop responses correct the load imbalance and the frequency of the grid is restored to the control frequency.

FIG. 4B shows transition zone 68B where controller 19 can operate gas turbines 20A and 20B incongruently so that they each undergo a different load imbalance response as speed returns to the steady state operating condition at segment 62C. In order to comply with NERC guidelines, grid 14 will still receive an effective total 4% droop response from power plant 12A, but the droop response will be incongruently distributed between gas turbines 20A and 20B. For example, if gas turbine 20B is more efficient than gas turbine 20A, gas turbine 20B can be operated to provide more of the load during the time period of transition zone 68B, thus relying less on the relatively inefficient load production from gas turbine 20A for the transitory time period. In an extreme example, a single gas turbine engine and electrical generator can be used to provide one-hundred percent of the droop response, but this may introduce increased operational costs resulting from inefficient operation of HRSG 18. Such increased costs would have to be weighed against potential benefits resulting from extreme bias to the most efficient gas turbine engine and electrical generator. In examples, gas turbines 20A and 20B can operate droop responses within twenty-five percent of each other; that is, one gas turbine engine (e.g., the more efficient engine) can provide up to seventy-five percent of the droop response while the other provides twenty-five percent in order to, for example, preserve the efficiency of HRSG 18.

In either the case of FIG. 4A or FIG. 4B, output of gas turbines 20A and 20B can be returned to congruent, e.g., symmetric or equal, operation following the load imbalance, as shown by segments 64C and 66C. For example, power plant 12A is configured so that gas turbine 20A and gas turbine 20B both operate in conjunction with HRSG 18. It is advantageous that HRSG receive exhaust EA and exhaust EB from gas turbines 20A and 20B at the same parameters, e.g., pressure and temperature, in order to improve the efficiency of the operation of HRSG 18 and, ultimately, steam turbine 26 and electrical generator 28.

Figure 5A:
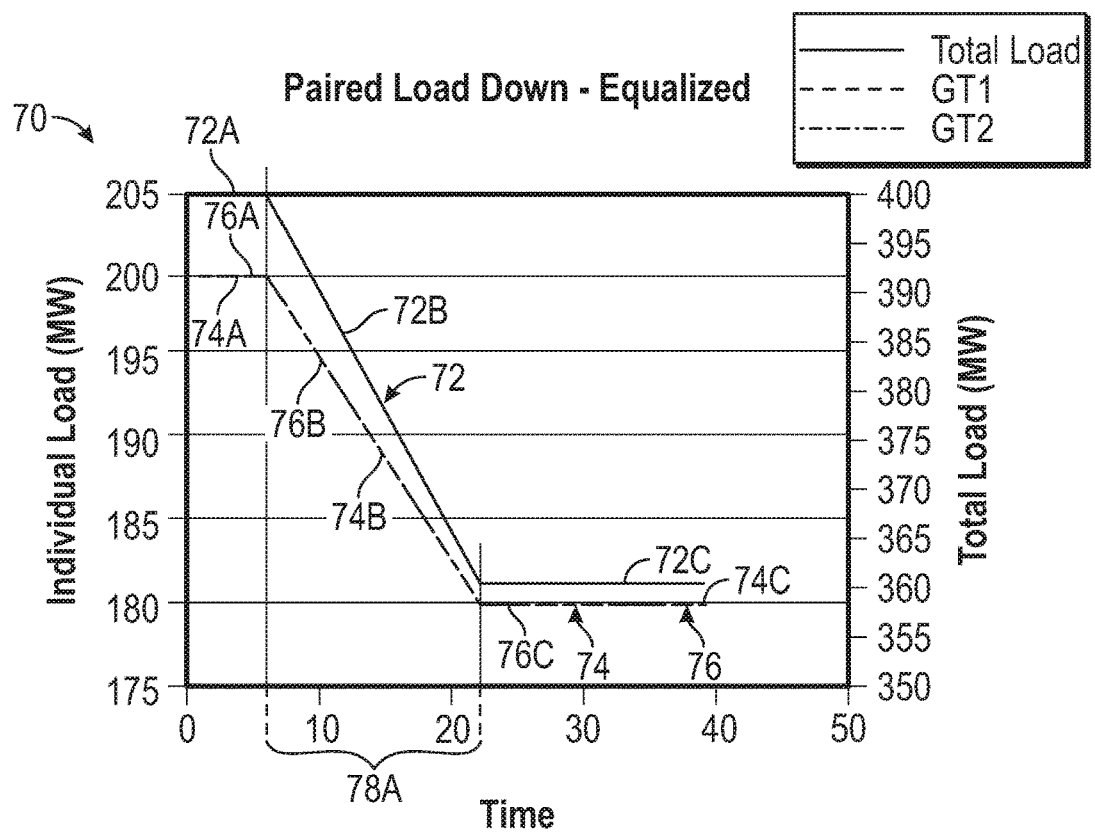
FIGS. 5A and 5B are graphs illustrating conventional load response and an incongruent load response of the present application, respectively.
Figure 5B:
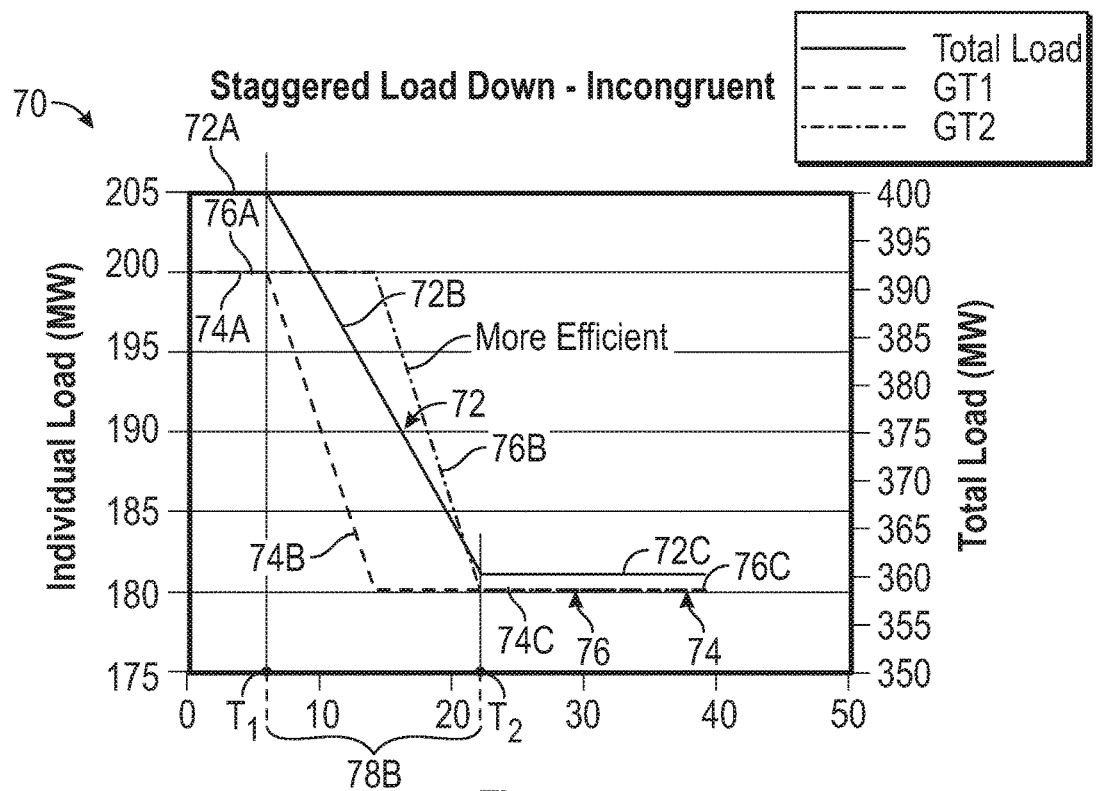

FIGS. 5A and 5B are graphs illustrating convention load response vs. an incongruent load response of the present application, respectively, for long term readjustment of total load requested by controller 15. FIGS. 5A and 5B show graph 70 including total load plot 72, first load plot 74 and second load plot 76. Total load plot 72 can correspond to the operating loads of generator units 16A and 16B, indicated as megawatts (MW), in power plant 12A. Load plots 74 and 76 can correspond to the load being provided by each of turbines 20A and 20B, such as in megawatts (MW), at a given time, respectively. Note, load plot 72 is offset on the Y axis to improve visibility by avoiding overlap with load plots 74 and 76. FIGS. 5A and 5B can illustrate a load adjustment, or load down imbalance response, for a load change that can occur as a result of a load imbalance, such as a change in demand on grid 14. For example, load on grid 14 can suddenly drop when factory 14 goes offline resulting in a long term change in power demand. Additionally, weather or other conditions can cause controller 15 to adjust the baseline operating output of power plants 12A, 12B and 12C to account for environmental temperature increases or nighttime operating conditions that can necessitate longer term adjustment of power output versus as compared to a short term droop response. In a load down imbalance response, output of the less efficient gas turbine can be more rapidly reduced, as shown in FIG. 5B. Likewise, controller 19 can operate gas turbines 20A and 20B to respond to a load up imbalance response by favoring the more efficient engine.

For example, load plots 74 and 76 indicate that gas turbines 20A and 20B provide a steady state output of, for example, 200 MW, as indicated by segments 74A and 76A. Total load plot 72 shows a corresponding 400 MW output at segment 72A under steady state operating conditions. The load requirement of the grid 14 can suddenly drop at time T1 during a load imbalance situation. Accordingly, the demand on gas turbines 20A and 20B can also drop, such that segments 74B and 76B decline in transition zone 78A. Total load plot 72 correspondingly drops at segment 72B. In transition zone 78A of FIG. 5A, controller 19 can operate gas turbines 20A and 20B to adjust the load output of each of gas turbines 20A and 20B until the total load drops to the new demand of 360 MW. As shown in FIG. 5A, controller 19 can operate gas turbines 20A and 20B equally, or congruently, so that they undergo the same transition, indicated by segments 74B and 76B, as output is adjusted to meet the subsequent new steady state operating condition at segment 72C. FIG. 5A shows gas turbines 20A and 20B equally sharing the 40 MW drop by reducing the output of each equally 20 MW, as shown by segments 74C and 76C.

FIG. 5B shows transition zone 78B where controller 19 can operate gas turbines 20A and 20B incongruently so that they undergo different load reductions to transition to the new steady state operating condition at segment 72C. For example, if gas turbine 20B is more efficient than gas turbine 20A, gas turbine 20B can be operated to provide more of the load during time period of transition zone 78B, thus relying less on the relatively inefficient load production from gas turbine 20A for a transitory period of tune. As discussed above, the load up or load down imbalance response for each gas turbine engine can be different to achieve an operational benefit that can be weighed against any operational cost incurred in operating HRSG 18 more inefficiently.

After controller 15 for grid 14 has accounted for any load imbalance on grid 14, power plant 12A can operate at the new steady state operation, such as by providing 360 MW of output. In either the case of FIG. 5A or FIG. 5B, output of gas turbines 20A and 20B can be returned to congruent or equal operation following the transition period 78A, 78B. For example, power plant 12A is configured so that gas turbine 20A and gas turbine 20B both operate in conjunction with HRSG 18 at an output of 180 MW, as shown by segments 74C and 76C.

Figure 6:
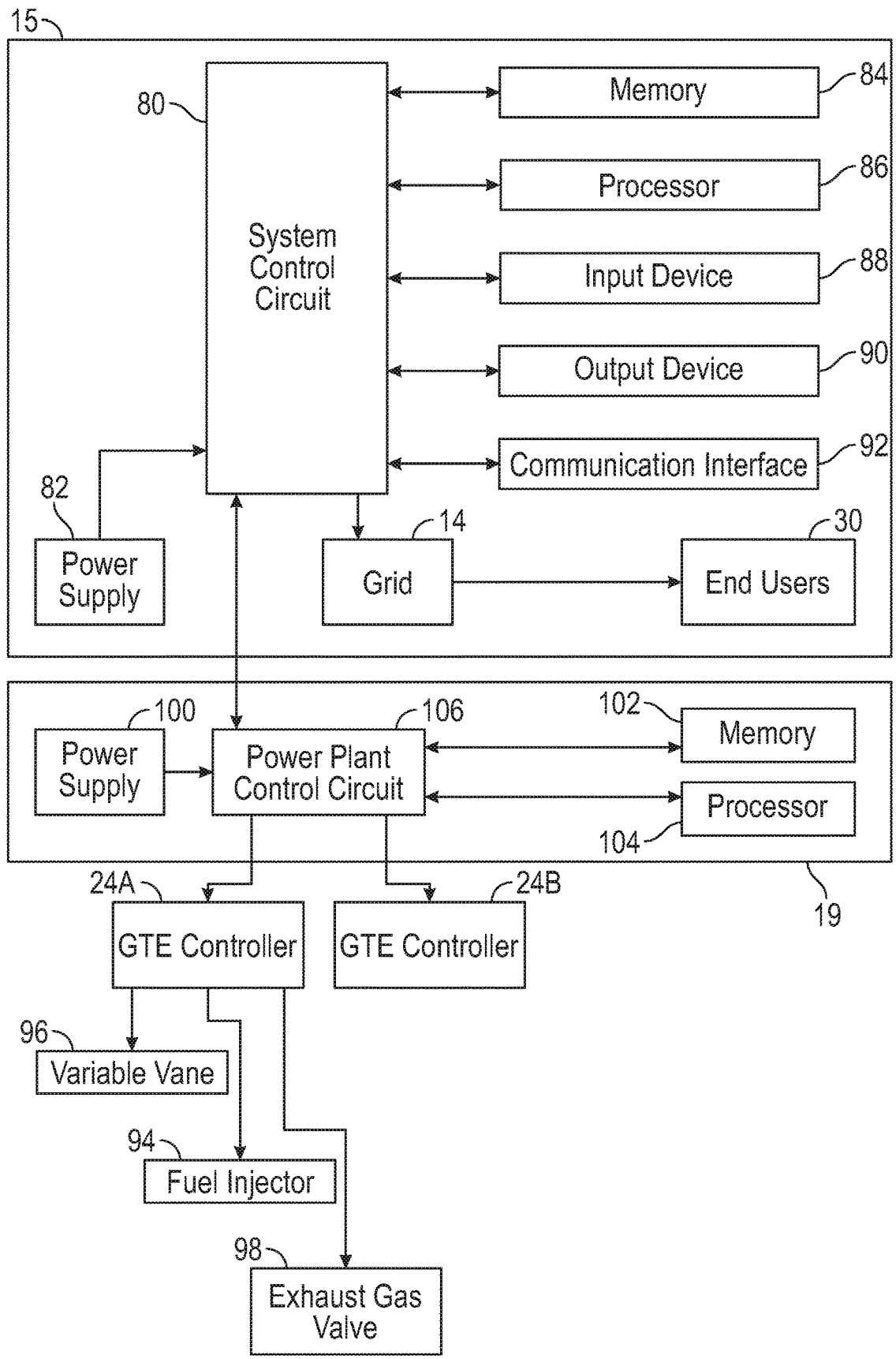
FIG. 6 is a schematic diagram illustrating components of controllers for operating the power system and power plants of FIG. 1.

FIG. 6 is a schematic diagram illustrating components of controller 15 for operating power system 10 and power plant controller 19 for operating generator units 16A and 16B of FIG. 1. Controller 15 can include circuit 80, power supply 82, memory 84, processor 86, input device 88, output device 90 and communication interface 92. Controller 15 can be in communication with grid 14, which can provide power to end users 30. Controller 15 can also be in communication with power plant controller 19, which can be in communication with one or more gas turbine engine controllers, such as engine controllers 24A and 24B. Engine controllers 24A and 24B can be in communication with gas turbines 20A and 20B, respectively, to control operation of each turbine. For example, engine controller 24A can be configured to control the combustion process in combustor 38A, which can alter the power output of gas turbine 20A to influence the speed of turbine shaft 42A and the flow of exhaust gas EA to HRSG 18 (FIG. 1) To that end, engine controller 24A can be configured to operate one or more fuel injectors 94, variable vanes 96 and exhaust gas valve 98 for gas turbine 20A. Engine controller 24B can also control similar parameters and components of gas turbine 20B, but description and illustration is omitted with reference to FIG. 6 for brevity.

Power plant controller 19 and engine controllers 24A and 24B can also include various computer system components that facilitate receiving and issuing electronic instructions, storing instructions, data and information, communicating with other devices, display devices, input devices, output devices and the like. For example, power plant controller 19 can include power supply 100, memory 102, processor 104, control circuit 106 and the like.

Circuit 80 can comprise any suitable computer architecture such as microprocessors, chips and the like that allow memory 84, processor 86, input device 88, output device 90 and communication interface 92 to operate together. Power supply 82 and power supply 100 can comprise any suitable method for providing electrical power to controller 15 and controller 19, respectively, such as AC or DC power supplies. Memory 84 and memory 102 can comprise any suitable memory devices, such as random access memory, read only memory, flash memory, magnetic memory and optical memory. Input device 88 can comprise a keyboard, mouse, pointer, touchscreen and other suitable devices for providing a user input or other input to circuit 80 or memory 84. Output device 90 can comprise a display monitor, a viewing screen, a touch screen, a printer, a projector, an audio speaker and the like. Communication interface 92 can comprise devices for allowing circuit 80 and controller 15 to receive information from and transmit information to other computing devices, such as a modem, a router, an I/O interface, a bus, a local area network, a wide area network, the internet and the like.

Controller 15 can be configured to operate grid 14 and, as such, can be referred to the "home office" for power system 10. Grid 14 can comprise power plants 12A, 12B and 12C, high voltage transmission lines that carry power from distant sources to demand centers, and distribution lines that connect end users 30. As mentioned, power grids can be configured to operate at a control frequency where all power input into the grid from disparate sources in input at the same frequency to facilitate integration of the power. In an example, grid 14 can operate at a control frequency of 60 Hertz (Hz).

Controller 15 can determine the demand being placed on grid 14, such as by monitoring the consumption of end users 30. Controller 15 can coordinate generation of power from power plants 12A, 12B and 12C (FIG. 1). That is, controller 15 can assign or instruct each of power plants 12A, 12B and 12C how much power output they should contribute to grid 14, and such assignment may be dynamic and reactive based upon the capabilities and availability of any of the power plants 12A, 12B and 12C. Controller 15 can ensure that the total power generated by power plants 12A, 12B and 12C meets the power demand of end users 30. If power demand of end users 30 exceeds or is less than power supplied by power plants 12A, 12B and 12C, controller 15 can dictate response strategies for each of power plants 12A, 12B and 12C. For example, in the event of a power demand increase that exceeds the predicted operating band, controller 15 can ensure that each of power plants 12A, 12B and 12C responds so that only one or less than all of the power plants is prevented from bearing the burden of generating power for the deficiency. Thus, controller 15 can interface with a power plant controller for each of power plants 12A, 12B and 12C, like controller 19 for power plant 12A.

Circuit 80 can communicate with, that is, read from and write to, a memory device such as memory 84. Memory 84 can include various computer readable instructions for implementing operation of grid 14. Thus, memory 84 can include instructions for monitoring demand on and power being supplied to grid 14. Circuit 80 can be connected to various sensors to perform such functions. Memory 84 can also include information that can assist controller 15 in providing instruction to power plant controller 19. For example, memory 84 can include the type, size (capacity), age, maintenance history, location, the location within the geography covered by grid 14, and proximity to end users 30 of each of power plants 12A, 12B and 12C. Memory 84 can also include instructions for determining the percentage of each of power plants 12A, 12B and 12C contribution to the total power supply.

Controller 19 can be configured to operate power plant 12A. As mentioned, power plants 12B and 12C can be configured to operate with similar controllers as controller 19, but illustration and description is omitted. Memory 102 can include various computer readable instructions for implementing operation of power plant 12A. Thus, memory 102 can include instructions for monitoring a power generation assignment from controller 15, instructions for power generation for each of engine controllers 24A and 24B, droop responses and imbalance responses for each of generator units 16A and 16B and the like. Memory 102 can also include information that can assist controller 19 in responding to imbalance requests from controller 15, such as they type, size (capacity), age, maintenance history and location for each of gas turbines 20A and 20B.

Additionally, memory 102 can include operational efficiency information, such as productive and economical efficiency information for each of generator units 16A and 16B, including gas turbines 20A and 20B. For example, memory 102 can include the electrical production efficiency of each of turbines 20A and 20B such as, for example, is illustrated in FIG. 2. Memory 102 can include economical information such as maintenance and economical history for each of gas turbines 20A and 20B such as, for example, is illustrated in FIG. 3, which can also include time since last service, repair, overhaul, refurbishment status, etc. Memory 102 can also include information relating to operational efficiency of power plant 12A including the financial efficiency of each of gas turbines 20A and 20B, such as various contractual obligations for operators of power plant 12A and manufacturers of and service providers for gas turbines 20A and 20B. For example, operators of power plant 12A can have a Long Term Service Agreement (LTSA) for each of gas turbines 20A and 20B. The LISA can sometimes require the manufacturer to provide, without fee to the power plant operator, routine maintenance, including parts and labor. There can, however, be restrictions placed on the operation of the gas turbines. For example, if the gas turbines are operated above an effective economical hours limit, an actual economical hours limit, above a threshold number of starts and stops, or operated above a temperature threshold for an hours limit (effective economical hours can be calculated, for example, from actual economical hours and number of hours operated above the temperature threshold), the fee arrangement can include charges to the power plant operator. For example, the power plant operator can be required under the LISA to make higher payments, additional payments, penalty payments or the like.

Controller 19 can receive notifications of changes in steady state operation of power system 10 from controller 15. Controller 19 can also directly monitor operation of grid 14 to detect power demand and load imbalances, using sensors or other components and systems. In either configuration, controller 15 can be indirectly or directly monitoring power demand and detecting load imbalance conditions.

In response to steady state operating conditions or load imbalance conditions, controller 19 can issue instructions to, and receive inputs from engine controllers 24A and 24B of gas turbines 20A and 20B. For example, controller 19 can issue start and stop command signals to engine controllers 24A and 24B. Engine controllers 24A and 24B can activate an electric or pneumatic starter motor to rotate turbine shaft 42A, and operate fuel injectors 94 to provide fuel to combustors 38A and 38B, as well as operate an ignitor to begin the combustion process. Engine controllers 24A and 24B can increase or decrease the power output by controlling the combustion process, such as by providing more or less fuel to combustors 38A and 38B with injectors 94 and, if desired, adjustment of variable vanes 96 that can be located in compressors 36A and 36B. Increased or decreased power output of gas turbine 20A and 20B can correspond to increased or decreased speed of shafts 42A and 42B, respectively.

Controller 19 can also issue instructions to engine controllers 24A and 24B for operating gas turbines 20A and 20B in response to a load imbalance on grid 14. Controller 15 for power system 10 can, in response to determining a load imbalance, issue instructions or power generation assignments to power plants 12A, 12B and 12C. The load imbalance instructions can require that each power plant increase or decrease power generation for a fixed or variable length of time. Thus, controller 19 can issue power generation instructions to engine controllers 24A and 24B, and engine controllers 24A and 24B can issue operating instructions to gas turbines 20A and 20B to produce the assigned power generation. These instructions can include increasing or decreasing the power output by controlling the combustion process within combustors 38A and 38B with injectors 94 and variable vanes 96, thereby also resulting in a change in the speed of shafts 42A and 42B. As discussed herein, engine controllers 24A and 24B can use efficiency data stored in memory 102 or obtained elsewhere, such as from controller 15, to incongruently operate gas turbines 20A and 20B during a load imbalance response to provide operation that increases the operational benefit of power plant 12A or the home office of grid 14. The operational benefit can be in the form of, for example, a decrease in maintenance fees due to avoidance of penalty charged or a decrease in fuel consumption resulting from more efficient total mechanical operation of gas turbines 20A and 20B.

Figure 7:
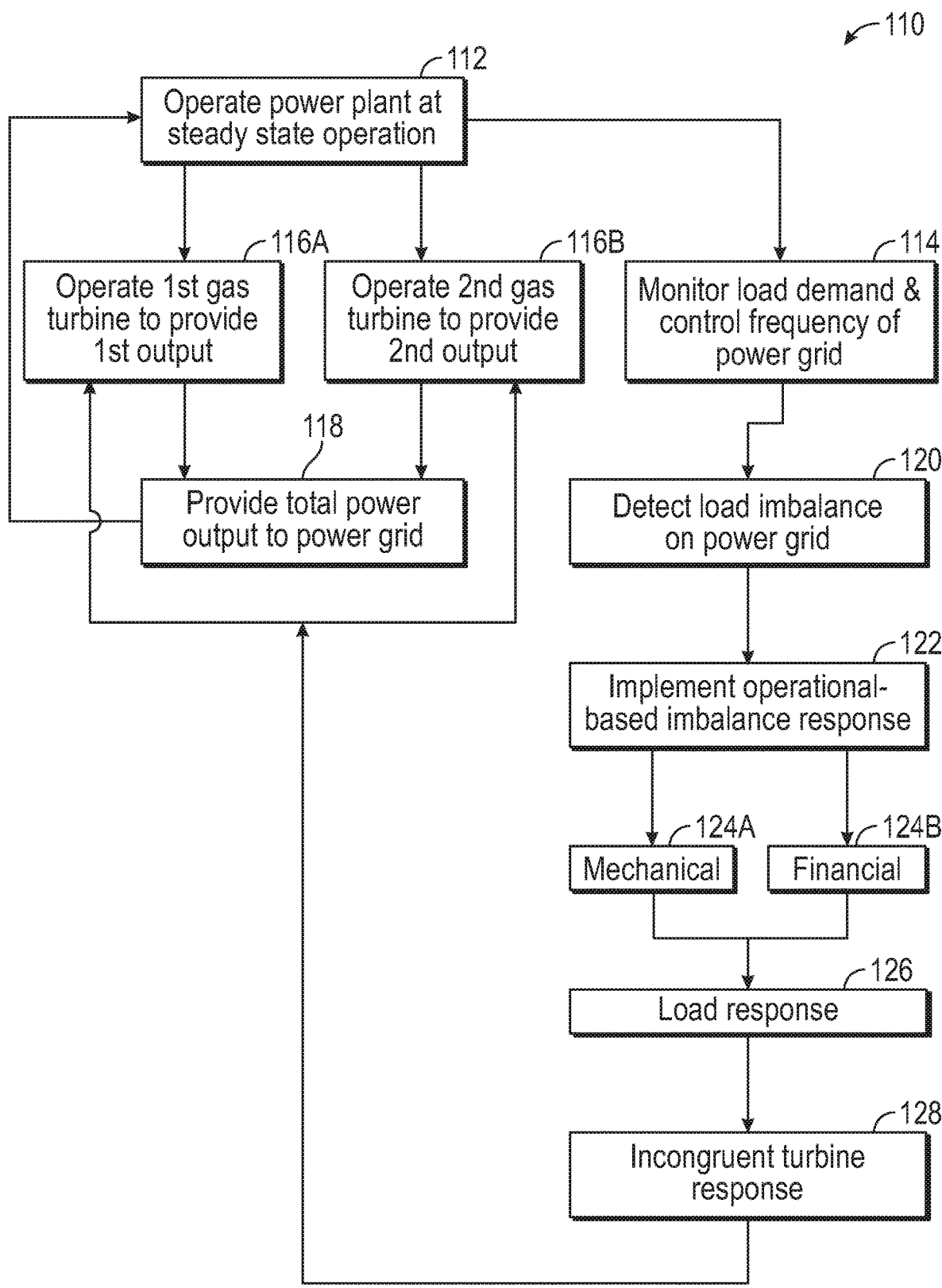
FIG. 7 is a line diagram illustrating steps of a method for providing incongruent droop and load imbalance responses for gas turbine engines of a power plant.

FIG. 7 is a line diagram illustrating steps of method 110 for providing incongruent load imbalance responses for gas turbines 20A and 20B for power plant 12A. At step 112, a power plant, such as power plant 12A, can operate in a steady state condition. That is, each of power plants 12A, 12B and 12C can operate their respective power generation equipment at a predicted, assigned output to meet expected demand from end users 30 that typically varies within a known band that can be readily accommodated by power plants 12A, 12B and 12C without load rebalancing. At step 112, controller 19 can control and monitor the operation of generator units 16A and 16B. Likewise, controller 15 can monitor the input of each of power plants 12A, 12B and 12C into grid 14.

Simultaneously, at step 114, controller 15 can monitor grid 14. That is, controller 15 for power system 10 can read the total load demand on grid 14 from end users 30. Controller 15 can reference information, such as information stored in memory 84, to evaluate the capacity, efficiency and location of power plants 12A, 12B and 12C to determine how to divide the total load demand between power plants 12A, 12B and 12C to provide steady state operating instructions to controllers 19 for power plants 12A, 12B and 12C.

At steps 116A and 116B, controller 19 for power plant 12A can receive its assigned load demand from controller 15 and issue corresponding instructions, e.g., power output command signals, to gas turbines 20A and 20B, respectively. Thus, engine controllers 24A and 24B can issue appropriate fuel and air instructions to gas turbines 20A and 20B to achieve the desired electrical output from generators 22A and 22B, respectively, and thus reduce the gap, if any, between electrical demand and supply. Thus, at step 118, power plant 12A can provide the assigned power output from controller 15 to grid 14.

At step 114, controller 15 can continue to monitor steady state operation of power system 10, monitoring output of power plants 12A, 12B and 12C and demand from end users 30. At step 120, controller 15 can detect a load imbalance on grid 14. As discussed, examples of load imbalance can include a sudden, significant demand drop or demand increase from end users 30, or a sudden output drop from one or more of power plants 12A, 12B and 12C, as is discussed, for example, with reference to FIGS. 4A and 4B. In response to detecting a load imbalance, controller 15 can issue imbalance response instructions to each of power plants 12A, 12B and 12C. For example, controller 19 for power plant 12A can receive the imbalance response and take appropriate action, such as to implement a particular droop response. Another example of a load imbalance can comprise a projected long term change in power demand that might require a load up or load down rebalancing of power generation from power plants 12A, 12B and 12C, as is discussed, for example, with reference to FIGS. 4A and 4B. As such, controller 15 can issue load rebalancing instructions to power plants 12A, 12B and 12C such as in a load down or load up situation where total power to grid 14 is changed for long term durations.

In the present application, each of power plants 12A, 12B and 12C can determine the appropriate action during the transitory period before the issuance of load rebalancing instructions from controller 15 to meet that imbalance response that is most operationally efficient for that power plant. The transitory period can comprise, for example, the time it takes for a droop response to correct the grid frequency or the time it takes to implement a load down or load up rebalancing of the grid. At step 122, during the transitory period, controller 19 will implement an operational-based load imbalance response while managing the net total power output of power plant 12A to operate in an expected manner, such as the 4% droop response, for example. For example, controller 19 can determine if power plant 12A will operate at the least cost by favoring one of gas turbines 20A and 20B based on, for example, the more productive turbine (e.g., in terms of fuel-in, power out) or the less economically expensive turbine (e.g., in terms of maintenance costs, etc.). The efficiency determination can be evaluated based on instantaneous, real-time operating conditions of gas turbines 20A and 20B. That is, for example, efficiency curves, such as those in FIG. 2 can be consulted for the current operating state of power plant 12A and maintenance schedules, such as those in FIG. 3, can be consulted for the current maintenance state of power plant 12A. Other non-real-time factors can be considered, such as engine model and power plant type, etc.

At step 124A, controller 19 can execute a mechanical efficiency response. At step 124B, controller 19 can execute a financial efficiency response. In either a mechanical or financial based response, at step 126, controller 19 can provide a response to the load imbalance indicated by the shift of the instantaneous grid frequency away from the control frequency. In other examples, controller 19 can provide a response to a load imbalance resulting from a controlled load up or load down situation.

In a mechanical efficiency response at step 124A, controller 19 will evaluate the current operating state and can operate whichever of gas turbines 20A and 20B that is most efficient at converting fuel into electrical power for a given output level to bear a greater percentage of the total power output of power plant 12A during the period of load imbalance. For example, gas turbine 20A can be considered the "more efficient turbine" for the purposes of executing the load response at steps 126 relative to operating power output $O_A$ and $O_B$, as shown in FIG. 2.

In a financial efficiency response at step 124B, controller 19 will evaluate the current operating state and can operate whichever of gas turbines 20A and 20B that will incur or potentially incur less fees or expenses to bear a greater percentage of the total power output of power plant 12A. For example, gas turbine 20B can be considered the "more efficient turbine" for the purposes of executing the load response at step 126 because it has more recently undergone maintenance, as shown in FIG. 3.

At step 126, a load response can be instructions from controller 19 to engine controller 24A in response to the actual, instantaneous frequency of grid 14 deviating from the control frequency. As discussed, for a droop response at step 126, an incongruent turbine droop response can be applied, wherein the more efficient turbine can be operated with a more robust droop response to bear a greater percentage of the power output of power plant 12A during a short term period where a temporary load imbalance is cleared while operating within a single steady state condition. In an example, the more efficient turbine can be operated at a higher power output than the less efficient turbine during a brief period of a load spike such that the combination of output from both turbines provides the appropriate droop response until a return to the previous steady state condition is achieved. As discussed, for a load change response at step 126, an incongruent load response can be applied, wherein the more efficient turbine can be operated with a more robust load down or load up response to bear a greater percentage of the power output of power plant 12A during a short term period where a temporary transition occurs between a long term change in the steady state operating condition. In an example, the more efficient turbine can be operated at a higher power output than the less efficient turbine during a period of shifting baseload assignment from controller 15 to power plant 12A such that the combination of output from both turbines provides the appropriate power output called for by controller 15 until a return to a new steady state operation is achieved. At step 128, the incongruent turbine response can be implemented and system 10 can return to a steady state operation at step 112.

The systems and methods discussed in the present application can be useful in increasing operational benefit of electrical power producers, either at the grid level or the power plant level. Operational benefits can include increasing mechanical efficiencies to reduce fuel costs or increasing financial efficiencies to reduce maintenance or contractual operation costs, for example. The operational benefits can be achieved by favoring more efficient gas turbine engines or generator units under particular short term load imbalance situations. Short term load imbalance situations can include "droop responses" that occur as a result of sudden changes in power demand from the grid at a steady state operating condition, and long term load imbalance situations can include "load changes" that occur as a result of a planned transition period from a first steady state operating condition to a second different steady state operating condition. The incongruent operation of more and less efficient gas turbine engines and generator units is particularly advantageous in cogeneration or combined cycle power plants that may use a HRSG where exhaust from gas turbine engines are used to generate power by heating steam to drive an additional generator unit. In these types of systems, it is desirable that the gas turbine engines operate with the same or similar operating parameters to increase the efficiency of the HRSG operation. Thus, conventionally, the short term load imbalances were accommodated by operating each gas turbine engine at the same output to preserve the efficiency of the HRSG. However, the systems and methods of the present application can obtain better overall efficiencies by perhaps sacrificing some of the HRSG efficiency to achieve greater efficiencies relating to the operation of the gas turbine engines and generator units.

Various Notes & Examples

Example 1 can include or use subject matter such as a method of controlling an imbalance response in a power plant comprising a first gas turbine engine, a second gas turbine engine and a steam turbine driven by steam generated by exhaust from the first gas turbine engine and the second gas turbine engine, the method can comprise operating the first gas turbine engine at a first power output, operating the second gas turbine engine at a second power output, monitoring load demand from a power grid operating at a steady state condition, detecting a load imbalance on the power grid that causes a deviation from the steady state condition, and adjusting the first power output and the second power output incongruently during the imbalance response to change the first power output and the second power output to match the deviation from the steady state condition, the incongruence depending on contemporaneous efficiency states of the first gas turbine engine and the second gas turbine engine.

Example 2 can include, or can optionally be combined with the subject matter of Example 1, to optionally include a steady state operating condition that can comprise a control frequency, and a first speed and the second speed that can be configured to operate at the control frequency in the steady state operating condition.

Example 3 can include, or can optionally be combined with the subject matter of one or any combination of Examples 1 or 2 to optionally include a load imbalance that can comprise a deviation from the control frequency.

Example 4 can include, or can optionally be combined with the subject matter of one or any combination of Examples 1 through 3 to optionally include an imbalance response that can comprise adjusting the first power output and the second power output to reduce the deviation.

Example 5 can include, or can optionally be combined with the subject matter of one or any combination of Examples 1 through 4 to optionally include an imbalance response that can last for a terminable transition period.

Example 6 can include, or can optionally be combined with the subject matter of one or any combination of Examples 1 through 5 to optionally include an imbalance response that can comprise either: reducing the power output on the less efficient of the first gas turbine and the second gas turbine more rapidly in a load down condition, or increasing the power output on the more efficient of the first gas turbine and the second gas turbine more rapidly in a load up condition.

Example 7 can include, or can optionally be combined with the subject matter of one or any combination of Examples 1 through 6 to optionally include an imbalance response that can result in a new steady state condition.

Example 8 can include, or can optionally be combined with the subject matter of one or any combination of Examples 1 through 7 to optionally include a first gas turbine engine that can have a first productive efficiency at the steady state condition, and a second gas turbine engine that can have a second productive efficiency at the steady state condition, and in response to the first productive efficiency being greater than the second productive efficiency, the first power output can be adjusted to provide more of the imbalance response.

Example 9 can include, or can optionally be combined with the subject matter of one or any combination of Examples 1 through 8 to optionally include a productive efficiency that can comprise use of fuel to produce electrical power.

Example 10 can include, or can optionally be combined with the subject matter of one or any combination of Examples 1 through 9 to optionally include a first gas turbine engine that can have a first economical efficiency, a second gas turbine engine that can have a second economical efficiency, and in response to the first economical efficiency being greater than the second economical efficiency, the first power output can be adjusted to provide more of the imbalance response.

Example 11 can include, or can optionally be combined with the subject matter of one or any combination of Examples 1 through 10 to optionally include an economical efficiency that can comprise expenditure of assets to provide maintenance.

Example 12 can include or use subject matter such as a method of controlling power plant operation in response to changing conditions of a power grid, the method can comprise monitoring an operating frequency of the power grid relative to a control frequency, operating a first gas turbine and a second gas turbine at the control frequency to provide a total power output to meet the power demand under steady state operating conditions, wherein under steady state operating conditions a first power output of the first gas turbine and a second power output of the second gas turbine are equal, detecting a load imbalance from the power grid wherein the operating frequency and the control frequency are different, and operating the first gas turbine and the second gas turbine to provide an imbalance response wherein the first power output and the second power output are incongruent such that the power plant operates to increase an operational efficiency during the load imbalance compared to a congruent imbalance response of the first gas turbine and the second gas turbine during the load imbalance.

Example 13 can include, or can optionally be combined with the subject matter of Example 12, to optionally include operating a heat recovery steam generator with exhaust of the first gas turbine and the second gas turbine.

Example 14 can include, or can optionally be combined with the subject matter of one or any combination of Examples 12 or 13 to optionally include an operational efficiency that can comprise a mechanical efficiency.

Example 15 can include, or can optionally be combined with the subject matter of one or any combination of Examples 12 through 14 to optionally include a mechanical efficiency that can comprise conversion of fuel to electrical power.

Example 16 can include, or can optionally be combined with the subject matter of one or any combination of Examples 12 through 15 to optionally include an operational efficiency that can comprise a financial efficiency.

Example 17 can include, or can optionally be combined with the subject matter of one or any combination of Examples 12 through 16 to optionally include a financial efficiency that can comprise a maintenance or operating expenditures.

Example 18 can include, or can optionally be combined with the subject matter of one or any combination of Examples 12 through 17 to optionally include a load imbalance that can comprise a change in load demand from the grid.

Example 19 can include, or can optionally be combined with the subject matter of one or any combination of Examples 12 through 18 to optionally include an imbalance response that can comprise determining a first efficiency of the first gas turbine and the first power output, determining a second efficiency of the second gas turbine at the second power output, and in response to the first efficiency being greater than the second efficiency, operating the first gas turbine at a higher output than the second gas turbine.

Example 20 can include, or can optionally be combined with the subject matter of one or any combination of Examples 12 through 19 to optionally include an imbalance response that can comprise operating the first gas turbine at a higher output level than the second gas turbine until the load imbalance is corrected.

Example 21 can include, or can optionally be combined with the subject matter of one or any combination of Examples 12 through 20 to optionally include a load imbalance that can comprise an excursion of the operating frequency of the grid from the control frequency.

Example 22 can include, or can optionally be combined with the subject matter of one or any combination of Examples 12 through 21 to optionally include an imbalance response that can comprise operating a more efficient of the first gas turbine and the second gas turbine at a larger droop response level than a less efficient of the first gas turbine and the second gas turbine until the load imbalance is corrected.

Example 23 can include or use subject matter such as a control system for operating a power plant, the control system can comprise a first engine controller for controlling a first combustion process in a first gas turbine engine powering a first electric generator, a second engine controller for controlling a second combustion process in a second gas turbine engine powering a second electric generator, and a power plant controller that can comprise a gas turbine interface for providing control input signals to the first engine controller and the second engine controller to control output of the first electric generator and the second electric generator, a grid interface for receiving a control frequency at which a power grid is to be operated, a droop response instruction for responding to a load imbalance on the power grid, and a current operating frequency of the power grid, and memory having stored therein efficiency data for the first gas turbine engine and the second gas turbine engine, wherein the power plant controller can be configured to incongruently provide control input signals to the first engine controller and the second engine controller based on the efficiency data in response to the current operating frequency deviating from the control frequency in order to meet the droop response instruction.

Example 24 can include, or can optionally be combined with the subject matter of Example 23, to optionally include a steam turbine powered by exhaust gas of the first gas turbine engine and the second gas turbine engine.

Example 25 can include, or can optionally be combined with the subject matter of one or any combination of Examples 23 or 24 to optionally include a power plant controller that can determine a productive efficiency of each of the first gas turbine engine and the second gas turbine engine, and increase output of either one of the first gas turbine engine and the second gas turbine engine that has the greater productive efficiency.

Example 26 can include, or can optionally be combined with the subject matter of one or any combination of Examples 23 through 25 to optionally include a power plant controller that can determine an economical efficiency of each of the first gas turbine engine and the second gas turbine engine, and increase output of either one of the first gas turbine engine and the second gas turbine engine that has the greater operation efficiency.

Each of these non-limiting examples can stand on its own, or can be combined in various permutations or combinations with one or more of the other examples.

The above detailed description includes references to the accompanying drawings, which from a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of controlling an imbalance response in a power plant comprising a first gas turbine engine, a second gas turbine engine and a steam turbine driven by steam generated by exhaust from the first gas turbine engine and the second gas turbine engine, the method comprising:
operating the first gas turbine engine at a first power output;
operating the second gas turbine engine at a second power output;
monitoring load demand from a power grid operating at a steady state condition;
detecting a load imbalance on the power grid that causes a deviation from the steady state condition; and adjusting the first power output and the second power output incongruently during the imbalance response to change the first power output and the second power output to match the deviation from the steady state condition, the incongruence depending on contemporaneous efficiency states of the first gas turbine engine and the second gas turbine engine.

2. The method of claim 1, wherein:
the operating the first gas turbine engine comprises operating the first gas turbine engine at a first speed;
the operating the second gas turbine engine comprises operating the second gas turbine engine at a second speed;
the steady state operating condition comprises a control frequency; and
the first speed and the second speed are configured to operate at the control frequency in the steady state operating condition.

3. The method of claim 2, wherein the load imbalance comprises a deviation from the control frequency.

4. The method of claim 3, wherein the imbalance response comprises adjusting the first power output and the second power output to reduce the deviation.

5. The method of claim 4, wherein the imbalance response lasts for a terminable transition period.

6. The method of claim 4, wherein the imbalance response comprises either:
reducing the power output on the less efficient of the first gas turbine and the second gas turbine more rapidly in a load down condition; or
increasing the power output on the more efficient of the first gas turbine and the second gas turbine more rapidly in a load up condition.

7. The method of claim 6, wherein the imbalance response results in a new steady state condition.

8. The method of claim 1, wherein:
the first gas turbine engine has a first productive efficiency at the contemporaneous efficiency state;
the second gas turbine engine has a second productive efficiency at the steady state condition; and
in response to the first productive efficiency being greater than the second productive efficiency, the first power output is adjusted to provide more of the imbalance response.

9. The method of claim 8, wherein the productive efficiency comprises use of fuel to produce electrical power.

10. The method of claim 1, wherein:
the first gas turbine engine has a first economical efficiency;
the second gas turbine engine has a second economical efficiency; and
in response to the first economical efficiency being greater than the second economical efficiency, the first power output is adjusted to provide more of the imbalance response.

11. The method of claim 10, wherein the economical efficiency comprises expenditure of assets to provide maintenance.

12. A method of controlling power plant operation in response to changing conditions of a power grid, the method comprising:
monitoring an operating frequency of the power grid relative to a control frequency;
operating a first gas turbine and a second gas turbine at the control frequency to provide a total power output to meet the power demand under steady state operating conditions, wherein under steady state operating conditions a first power output of the first gas turbine and a second power output of the second gas turbine are equal;
detecting a load imbalance from the power grid wherein the operating frequency and the control frequency are different; and
operating the first gas turbine and the second gas turbine to provide an imbalance response wherein the first power output and the second power output are incongruent such that the power plant operates to increase an operational efficiency during the load imbalance compared to a congruent imbalance response of the first gas turbine and the second gas turbine during the load imbalance.

13. The method of claim 12, further comprising operating a heat recovery steam generator with exhaust of the first gas turbine and the second gas turbine.

14. The method of claim 12, wherein the operational efficiency comprises a mechanical efficiency.

15. The method of claim 14, wherein the mechanical efficiency comprises conversion of fuel to electrical power.

16. The method of claim 12, wherein the operational efficiency comprises a financial efficiency.

17. The method of claim 16, wherein the financial efficiency comprises a maintenance or operating expenditures.

18. The method of claim 12, wherein the load imbalance comprises a change in load demand from the grid.

19. The method of claim 18, wherein the imbalance response comprises:
determining a first efficiency of the first gas turbine and the first power output;
determining a second efficiency of the second gas turbine at the second power output; and
in response to the first efficiency being greater than the second efficiency, operating the first gas turbine at a higher output than the second gas turbine.

20. The method of claim 19, wherein the imbalance response comprises operating the first gas turbine at a higher output level than the second gas turbine until the load imbalance is corrected.

21. The method of claim 12, wherein the load imbalance comprises an excursion of the operating frequency of the grid from the control frequency.

22. The method of claim 21, wherein the imbalance response comprises operating a more efficient of the first gas turbine and the second gas turbine at a larger droop response level than a less efficient of the first gas turbine and the second gas turbine until the load imbalance is corrected.

23. A control system for operating a power plant, the control system comprising:
a first engine controller for controlling a first combustion process in a first gas turbine engine powering a first electric generator;
a second engine controller for controlling a second combustion process in a second gas turbine engine powering a second electric generator; and
a power plant controller comprising:
a gas turbine interface for providing control input signals to the first engine controller and the second engine controller to control output of the first electric generator and the second electric generator;
a grid interface for receiving a control frequency at which a power grid is to be operated, a droop response instruction for responding to a load imbalance on the power grid, and a current operating frequency of the power grid; and memory having stored therein efficiency data for the first gas turbine engine and the second gas turbine engine;

wherein the power plant controller is configured to incongruently provide control input signals to the first engine controller and the second engine controller based on the efficiency data in response to the current operating frequency deviating from the control frequency in order to meet the droop response instruction.

24. The control system of claim 23, further comprising a steam turbine powered by exhaust gas of the first gas turbine engine and the second gas turbine engine.

25. The control system of claim 23, wherein the power plant controller determines a productive efficiency of each of the first gas turbine engine and the second gas turbine engine, and increases output of either one of the first gas turbine engine and the second gas turbine engine that has the greater productive efficiency.

26. The control system of claim 23, wherein the power plant controller determines an economical efficiency of each of the first gas turbine engine and the second gas turbine engine, and increases output of either one of the first gas turbine engine and the second gas turbine engine that has the greater operation efficiency.

* * * * *